United States Patent
Parikh et al.

(10) Patent No.: US 6,947,375 B2
(45) Date of Patent: Sep. 20, 2005

(54) SYSTEM AND METHOD FOR NETWORK CARD SWITCHOVERS IN AN IP NETWORK

(75) Inventors: Vimal Parikh, Fremont, CA (US); Amar Gupta, Cupertino, CA (US); Chi Fai Ho, Sunnyvale, CA (US)

(73) Assignee: Nokia Inc., Irving, TX (US)

( * ) Notice: Subject to any disclaimer, the term of this patent is extended or adjusted under 35 U.S.C. 154(b) by 195 days.

(21) Appl. No.: 10/353,196

(22) Filed: Jan. 27, 2003

(65) Prior Publication Data

US 2004/0146062 A1 Jul. 29, 2004

(51) Int. Cl.[7] ................................................ H04L 1/00
(52) U.S. Cl. .................... 370/218; 370/390; 370/395.5; 370/412; 370/415
(58) Field of Search .................................. 370/217–221, 370/389–390, 412–420, 225–228, 254, 463, 465

(56) References Cited

U.S. PATENT DOCUMENTS

| | | | |
|---|---|---|---|
| 5,596,569 A | * | 1/1997 | Madonna et al. ........... 370/217 |
| 6,226,261 B1 | | 5/2001 | Hurtta et al. |
| 6,687,247 B1 | * | 2/2004 | Wilford et al. ............. 370/392 |

FOREIGN PATENT DOCUMENTS

WO    WO 01/52571 A1    7/2001

OTHER PUBLICATIONS

McKeow et al, Tiny Terra: A Packet Switch Core, IEEE, pp. 26–33, 1997.*
Partridge et al, A 50–Gb/s IP Router, IEEE, pp. 237–248, 1998.*
Cisco 12000 Series (Gigabit Switch Routers), pp. 1–44, 1998.*
"Amber's (www.ambernetworks.com)—Rock–Solid ASR 2000: Density and Reliability"; Americas Aug. 2000: Issue Highlights; 2 pages. URL: http:/default.asp@journalid=3&func=departments&page=0008t261&year–2000&month=.
U.S. Patent & Trademark –International Searching Authority International Search Report, Aug. 5, 2004.
U.S. Patent & Trademark –International Searching Authority Written Opinion, Aug. 5, 2004.

* cited by examiner

*Primary Examiner*—Frank Duong
(74) *Attorney, Agent, or Firm*—Squire, Sanders & Dempsey, L.L.P.; Aaron Wininger (57) ABSTRACT

The system provides an IP network card that comprises a redundancy configuration register; an interface; and redundancy mapping logic. The redundancy configuration register stores card configuration data. The interface receives slot active signals from other cards. The redundancy mapping logic is communicatively coupled to the register and interface. The logic maps a packet to a slot having an active card based on the data in the register, an address in the packet, and received slot active signals.

12 Claims, 5 Drawing Sheets

SYSTEM AND METHOD FOR NETWORK CARD SWITCHOVERS IN AN IP NETWORK

TECHNICAL FIELD

This invention relates generally to network switching systems, and more particularly, but not exclusively, provides an apparatus and method for switching between redundant network cards in an IP network switching system.

BACKGROUND

Networks, such as local area networks (i.e., LANs) and wide area networks (i.e., WANs, e.g., the Internet), enable a plurality of nodes to communicate with each other. Nodes can include computers, servers, storage devices, mobile devices, PDAs, wireless telephones, etc. Networks can include the nodes themselves, a connecting medium (wired, wireless and/or a combination of wired and wireless), and network switching systems such as routers, hubs and/or switches.

Networks can be arranged in a variety of topologies or combinations of topologies. Typical topologies include a bus topology, a ring topology, a star topology, and combinations such as a star bus topology (also referred to as a tree topology). In a bus topology, all nodes are communicatively coupled to a bus or backbone. Networks that use a bus topology, such as Ethernet, are generally easy to set up and maintain.

In a ring topology, the nodes are communicatively coupled in a closed loop structure. Accordingly, each node is communicatively coupled to only two other nodes. Networks using a ring topology can be hard to install and maintain. However, ring topologies can enable high-speed communication over large distances.

In a star topology, all nodes are communicatively coupled to a hub. The hub enables communication between nodes by passing data received from one node to a second node. Networks using a star topology are relatively easy to set up and maintain and are therefore very common.

A star bus topology is a combination of star and bus topologies. Generally, groups of networks using star topologies are interconnected for communication using a bus topology. This type of topology is also very common for networks.

As many networks use a star topology or star bus topology, network switching systems are extremely important network devices. For example, if a component of a hub fails or the hub itself fails, a portion or the entire network that uses the hub could become disabled. There are three different types of hubs including a passive hub, an intelligent hub, and a switching hub. A passive hub simply retransmits data received from a node to all other nodes. Intelligent hubs operate similarly to passive hubs but also enable monitoring of data transmitted over the network. Switching hubs (also referred to as switches) only retransmit data received from one node to a specified destination node in an address of the packet of the data (unless the data is designated as multicast). Accordingly, switching hubs enable increased bandwidth on a network compared to other types hubs by only transmitting data to specified destination nodes.

Network switching systems such as switches use line cards to receive data from nodes and retransmit received data to other nodes. Line cards are printed circuit boards (PCBs) that provide receiving/transmitting ports that are communicatively coupled to nodes and to a backplane of the switch. In general, for each node on a network, a switch has two line cards: one that is active and one that is a backup (also referred to as a hot-standby line card). If the active line card fails, the backup line card takes over thereby preventing a failure of the network. However, conventional line card switchovers are done by network software in the switch. Therefore, switchovers can take several seconds leading to the possible loss of large amounts of data, especially in high bandwidth networks.

Accordingly, a new IP network card backup system and method are needed that overcome the disadvantages mentioned above.

SUMMARY

The present invention provides an IP network card (e.g., a line card or a service card) that comprises a redundancy configuration register; an interface; and redundancy mapping logic. An IP network card is a line interface card that handles classification, processing and forwarding of IP data packets. The redundancy configuration register stores card configuration data. The interface receives slot active signals from other cards. The redundancy mapping logic is communicatively coupled to the register and interface. The logic maps a packet, without the use of software, to a slot having an active card based on the data in the register, an address in the packet, and received slot active signals.

The IP network card can also include output queues and queue ID mapping logic. The output queues are communicatively coupled to the redundancy mapping logic. The queue ID mapping logic is communicatively coupled to the queues and capable to receive packets from a network node and to place the packets into the queues.

The present invention also provides a method. The method is executed in an IP network card, without the use of software. The method comprises: receiving a packet having a header that includes a destination slot address; determining if a destination slot corresponding to the destination slot address is active; and transmitting the packet based on the determining.

Accordingly, the system and method may advantageously enable fast card switchovers in an IP network.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
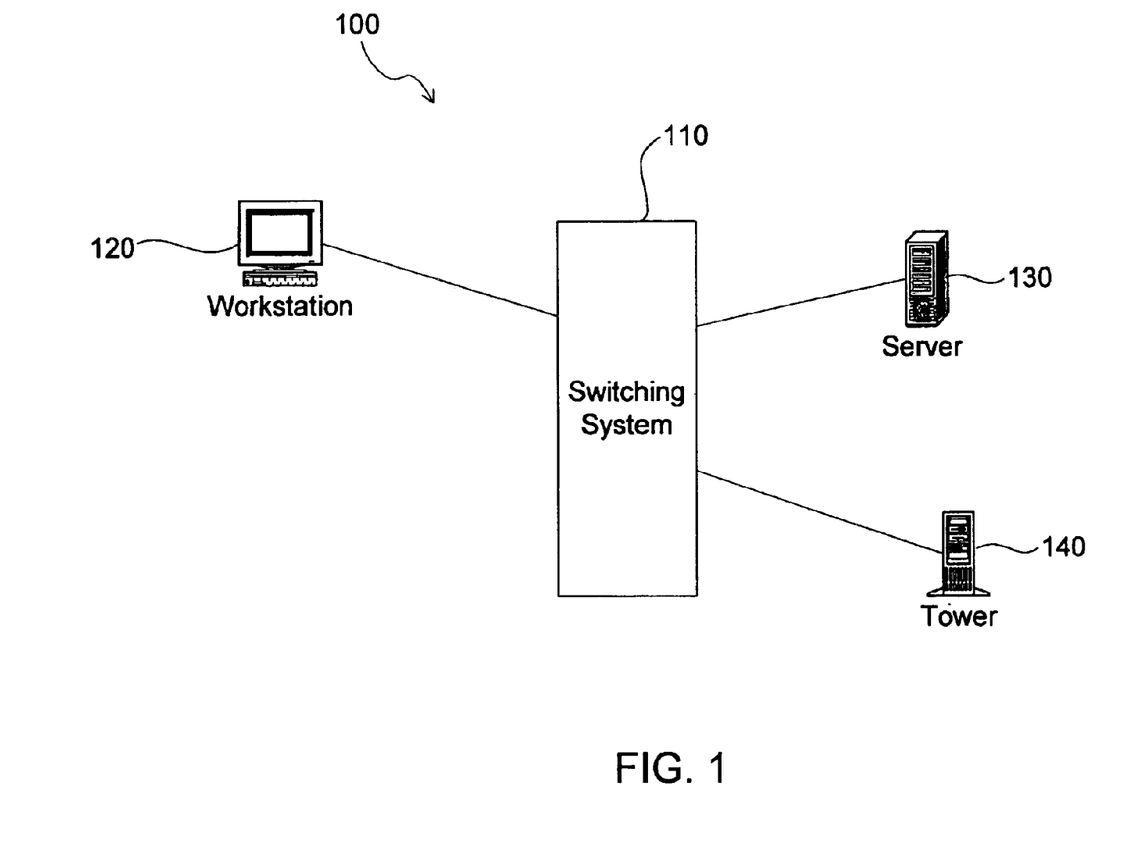
FIG. 1 is a block diagram illustrating an IP network system in accordance with an embodiment of the present invention.

FIG. 1 is a block diagram illustrating an IP network system 100 in accordance with an embodiment of the present invention. The IP network system 100 includes three nodes, e.g., a workstation 120, a server 130, and a tower 140. The nodes 120, 130, and 140 are communicatively coupled together via an IP network switching system 110, such as a switch or router. One of ordinary skill in the art will recognize that the IP system 100 can include additional nodes, such as storage devices, PDAs, mobile devices, etc., and additional IP network devices, such as hubs, routers, switches, etc.

As is known in the art, a network administrator uses network software to set up and administer the IP network system 100 so that the IP network switching system 110 knows where to route data received from nodes. For example, the workstation 120 can address a data packet 280 (FIG. 2) to the server 130 as the final destination and can transmit the data packet 280 to the IP network switching system 110. The final destination of the packet 280 is typically indicated as a destination address in a header of the packet 280. The IP network switching system 110 uses the destination address to identify a slot of the IP network switching system 110 that is coupled to the destination node. The IP network switching system 110 reads the destination address and, based on a lookup table stored in memory of the IP network switching system 110 that links slots of the IP network switching system 110 with nodes on the IP network system 100, routes it to the server 130. In an embodiment of the invention, the lookup table stores Media Access Control (MAC) addresses of nodes on the IP network with corresponding slot IDs of the IP network switching system 110, to which the nodes are communicatively coupled.

Figure 2:
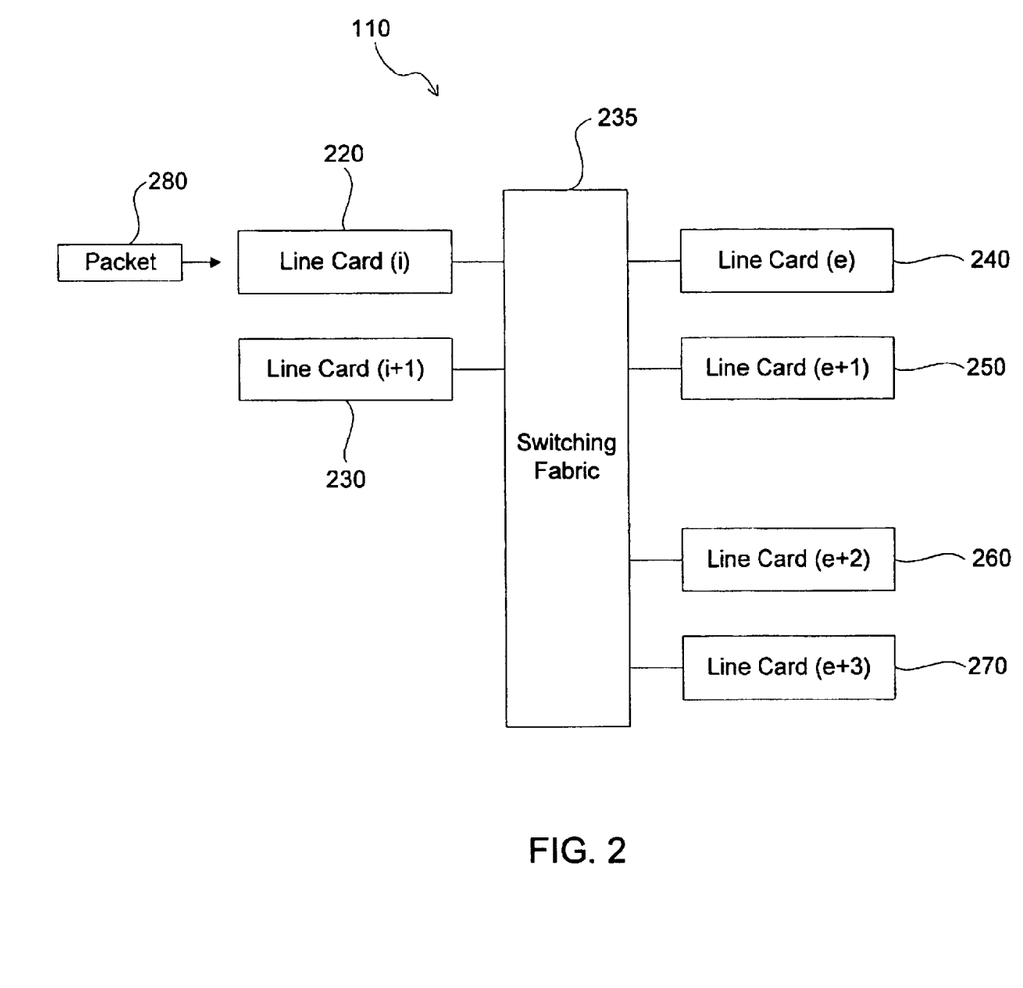
FIG. 2 is a block diagram illustrating an IP network switching system of the IP network system of FIG. 1.

FIG. 2 is a block diagram illustrating details of the IP network switching system 110 of the IP network system 100 (FIG. 1). The IP network switching system 110 includes a plurality of IP network cards, such as cards 220, 230, 240, 250, 260 and 270 that are capable of receiving and transmitting data between the nodes 120, 130 and 140 on the IP network system 100. The cards 220, 230, 240, 250, 260 and 270 are coupled together by a switching fabric 235 via slots of the switching fabric 235. Although the system is being described as using line cards, one skilled in the art will recognize that any type of card in an IP network, e.g., a service card, can benefit from this technology.

It is generally preferable to have pairs of cards (an active card and a backup card) for each node on the IP network system 100. Accordingly, even though six cards 220, 230, 240, 250, 260 and 270 are illustrated in FIG. 2, only three cards may be active. Each of the remaining cards serves as a backup card, in case its associated active card in the pair fails. For example, the cards 220 and 230 may form a pair, each independently capable of transmitting and receiving packets to and from the workstation 120. During an initial set up of the IP network system 100, the cards 220 and 230, via conventional handshaking techniques, negotiate which IP network card is active and which IP network card is backup. Assuming the card 220 negotiates to be the active IP network card, only the card 220 communicates with the workstation 120 node. In addition, the card 220 transmits a signal to the other cards indicating its status as the active card, and the card 220 transmits a signal to the other cards indicating its status as inactive/backup. For simplicity, it is preferable to have redundant card pairs as adjacent even-odd pairs differing in slot address by only the last digit of its binary address, e.g., (0–1, 2–3, etc.), although other card pairings are also possible.

In the above example, if the card 220 fails, the card 230 can take over as the active card and begin communicating with the workstation 120 node. In an embodiment of the present invention, as will be discussed further below, switchovers are performed by hardware in the cards themselves, without the use of software, thereby substantially increasing switchover speeds and reducing or eliminating data loss due to card failure.

Like the cards 220 and 230, the cards 240 and 250 can form a pair, each independently capable of transmitting and receiving data to and from the server 130 node. In an example, the card 240 may be the active card and the card 250 may be the backup card. Further, the cards 260 and 270 may form a pair, each independently capable of transmitting and receiving data to and from the tower 140 node. Further, the card 260 may be the active card and the card 270 may be the backup card. Alternatively, the cards 260 and 270 may not form a pair, and may each independently represent a different node.

In an example, the card 220 receives a packet 280 from the workstation 120 node. The packet 280 includes a header indicating that the final destination is the server 130 node (by indicating the slot to which the card 240 or 250 is coupled). The card 220 knows that the cards 240 and 250 are both communicatively coupled to the server 130 node and, based on received signals from the cards 240 and/or 250, determines which of the cards 240 and 250 is the active card. After determining which of the cards 240 and 250 is the active card, the card 220 directs the packet via the switching fabric 235 to the active card (e.g., card 240). The card 240 then transmits the packet 280 to the server 130 node. In the event that the card 240 fails, the card 220 substantially simultaneously (without using software) determines that the card 250 is now the active card and, instead, transmits packet 280 via the switching fabric 235 to card 250. The card 250 then transmits the packet to the server 130 node. The transmission of packets via cards will be discussed in further detail below in conjunction with FIG. 3, FIG. 4 and FIG. 5.

Figure 3:
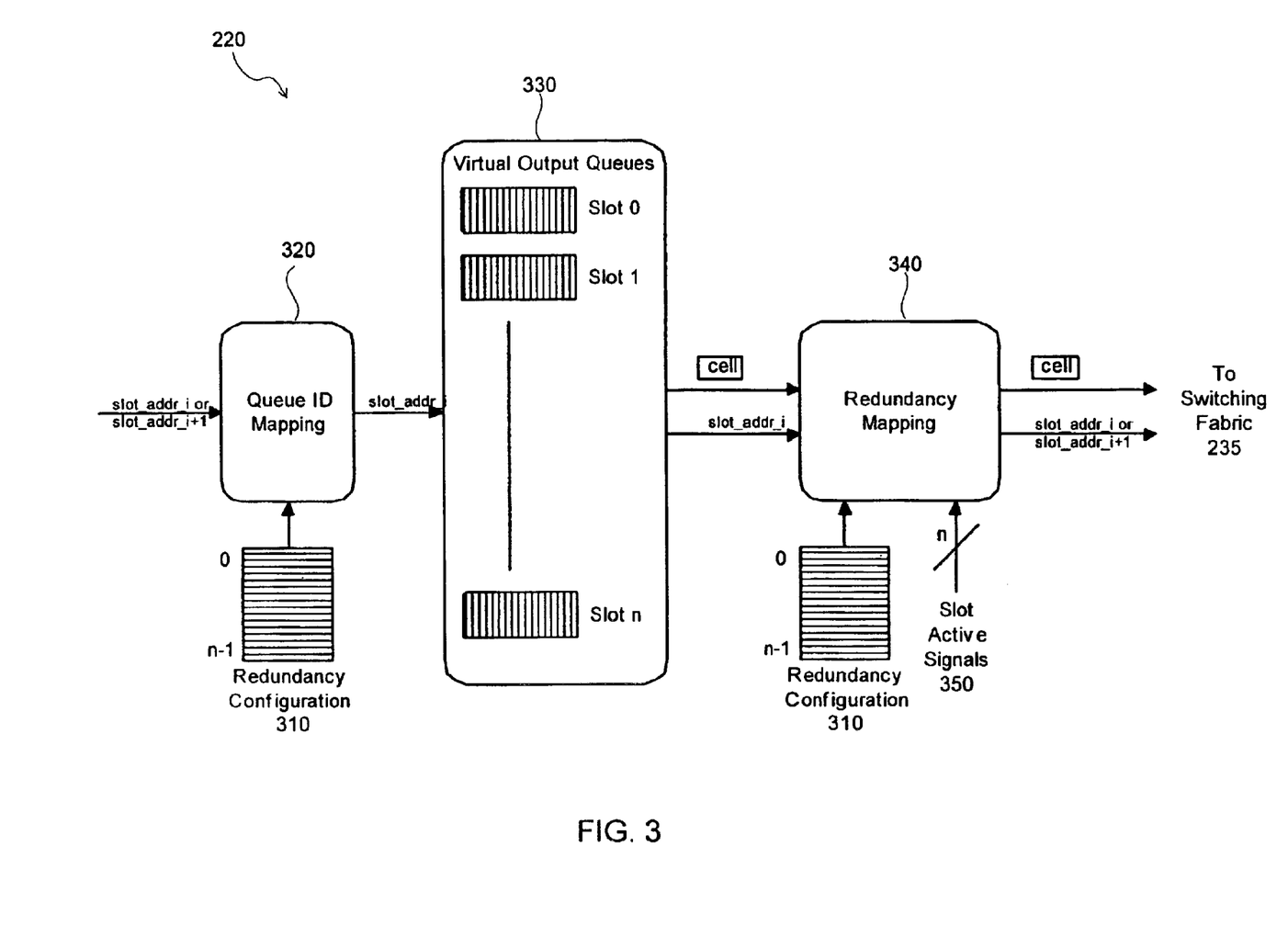
FIG. 3 is a block diagram illustrating an IP network card communicatively coupled to the switching fabric of FIG. 1.

FIG. 3 is a block diagram illustrating details of a card, e.g., card 220, which is communicatively coupled to the switching fabric 235 via a slot. In an embodiment of the invention, the cards 230, 240, 250, 260, and 270 are substantially similar to the card 220. The card 220 comprises queue ID mapping logic 320, a redundancy configuration register 310, virtual output queues 330, redundancy mapping logic 340 and terminals 350 to receive slot active signals. In addition, the card 220 includes a terminal (not shown) to transmit a slot active signal to other cards, e.g., via the switching fabric 235. The slot active signal indicates if the card 220 is an active card, as determined by the initial handshake between the card 220 and its redundant pair. In addition, if card 220 fails, it will either cease transmitting the slot active signal or will transmit a slot inactive signal. Once the card 220 fails, its redundant mate, e.g., the card 230, begins transmitting the slot active signal thereby indicating its new designation as the active card.

The redundancy configuration register 310 indicates, for each card pair, whether the card pair is configured as redundant. For example, the cards 240 and 250 may not be a redundant pair, e.g., the card 240 may be communicatively coupled to a first node and the card 250 may be communicatively coupled to a second node. Accordingly, if the card 240 fails, the first node would be unable to communicate with the other nodes on the IP network system 100. If there is no redundant pairing, no translation is necessary whether the card is active or not. The packet 280 would be simply transmitted via the slot indicated in its header (i.e., the card coupled to the slot indicated in its header). Alternatively, the cards 240 and 250 may be a redundant pair such that they are both communicatively coupled to the same node, e.g., the server 130 node. Thus, if the card 240 fails, the card 250 could take over communication with the server 130 node. In an embodiment of the invention, network management software feeds the redundancy setup data to the redundancy configuration register 310 during the initial setup of IP network system 100.

The queue ID mapping logic 320 directs incoming packets bound for redundant card pairs into the virtual output queues 330. As will be discussed further below, each slot (or each card coupled to a slot) has a corresponding queue in the virtual output queues 330. Accordingly, for example, the active card (e.g., card 0) of a redundant pair can be associated with one slot (e.g., slot 0), and the hot-standby card (e.g., card 1) of the redundant pair can be associated with another slot (e.g., slot 1). In an embodiment of the present invention, the queue ID mapping logic 320 will always map an incoming packet addressed to either one of a redundant pair into the queue of the even numbered slot. For example, if cards 'i' (even) and 'i+1' (odd) are configured as redundant, then incoming packets will always be forwarded to the card 'i' (even) queue. For cards 0 and 1, data packets will always be transmitted to slot 0. In an alternative embodiment of the invention, the data packets for a redundant pair could be transmitted into the queue for the odd numbered card of the redundant pair. Since the data packets for a redundant card pair are always sent to a single queue, the queue id mapping logic 320 ensures that the data packets going to a redundant card pair are delivered in order, regardless of which redundant pair card is active and which slot for the redundant pairs is actually specified in the packet header.

In an embodiment of the invention, the queue ID mapping logic 320 comprises a two-input AND gate, wherein the input can be expressed in Boolean logic as Destination Card ID AND ~0x1 (e.g., Destination Card ID AND 1110), "~" identifying a logical not and "0x" identifying hexadecimal notation. This logic ensures that an incoming packet is always placed into the even numbered queue. For a data packet having a destination card ID of 1, the Boolean logic would be:

| Destination ID: | 0001 |
| AND ~0x1: | 1110 |
| = Queue: | 0000. |

For a packet having a destination card ID of 0, the Boolean logic would be:

| Destination ID: | 0000 |
| AND ~0x1: | 1110 |
| = Queue: | 0000. |

As can be seen from the examples above, a data packet will always be placed into the even numbered queue of the virtual output queues 330.

Virtual output queues 330 comprise n queues, wherein n is the number of cards coupled to the switching fabric 235 (or slots of the switching fabric 235 that have cards coupled to them). The queues 330 enable buffering of incoming packets if there is congestion in the switching fabric 235. It will be appreciated that the even or odd queues for redundant pairs can be deemed superfluous and not included.

Redundancy mapping logic 340 maps (or translates) the destination address in the data packet to the card currently active of a redundant pair. The redundancy mapping logic 340 receives slot active signals 350 that indicate which slots (and therefore which cards) are active. If the destination address of the packet is for an active slot, as indicated by the slot active signals 350, then there is no need to translate the destination address to the backup card in the redundant pair. If the destination address indicates a non-active slot (e.g., a backup card or a failed card), then the redundancy mapping logic 340 translates the address to the card currently active. This determination can be done using a Field Programmable Gate Array (FPGA) or Application Specific Integrated Circuit (ASIC).

If the addressed card is inactive, the redundancy mapping logic 340 translates the destination address to the active slot. Accordingly, logic can be implemented to modify the final digit of the destination address, if the addressed card is currently inactive and the active card is a member of a redundant pair.

In one example, to map the destination address to the active slot, the redundancy mapping 340 comprises a two-input XOR gate wherein the first input is the address from the data packet and the second input is 0x1 (i.e., 0001). When it is determined that the original destination address is mapped to a non-active slot, this logic ensures that the destination address is mapped to the active slot. For example, for a packet having a card ID of 1, which is inactive, the Boolean logic is:

| Card ID: | 0001 |
| XOR 0x1: | 0001 |
| = Queue 0: | 0000. |

For a packet having a card ID of 0, which is inactive, the Boolean logic is:

| Card ID: | 0000 |
| XOR 0x1: | 0001 |
| = Queue 0: | 0001. |

Accordingly, as can be seen from the examples above, the packet will always be readdressed to the opposite slot whenever the initial address indicates an inactive slot.

In another example, the redundancy mapping logic 340 may comprise a two-input XOR gate, wherein the first input is the final digit of the destination address and the second input is the slot-active signal for the intended destination (active low). This logic ensures that the destination address is mapped to the active slot, when the destination address is mapped to a non-active slot.

For a data packet having a destination card ID of 4 (even), wherein the destination card is currently inactive and the slot active signals are active low, the logic would be:

| | |
|---|---|
| Original Destination ID: | 0100 |
| XOR Inactive: | 1 |
| = Actual Destination ID: | 0101. |

For a data packet having a destination card ID of 4 (even), wherein the destination card is currently active and the slot active signals are active low, the logic would be:

| | |
|---|---|
| Original Destination ID: | 0100 |
| XOR Active: | 0 |
| = Actual Destination ID: | 0100. |

For a data packet having a destination card ID of 5 (odd), wherein the destination card is currently inactive and the slot active signals are active low, the logic would be:

| | |
|---|---|
| Original Destination ID: | 0101 |
| XOR Inactive: | 1 |
| = Actual Destination ID: | 0100. |

For a data packet having a destination card ID of 5 (odd), wherein the destination card is currently active and the slot active signals are active low, the logic would be:

| | |
|---|---|
| Original Destination ID: | 0101 |
| XOR Active: | 0 |
| = Actual Destination ID: | 0101. |

As can be seen from the examples above, the data packet will be readdressed to the opposite slot when the destination address refers to an inactive slot and will remain the same when the destination address refers to an active slot. Although FIG. 3 shows the even address of redundant pair as the address to examine, one skilled in the art will recognize that it does not matter whether the redundancy mapping logic 340 examines and translates the original address in the data packet or the address as translated by the queue ID mapping logic 320 (e.g., the always even or always odd address).

Figure 4:
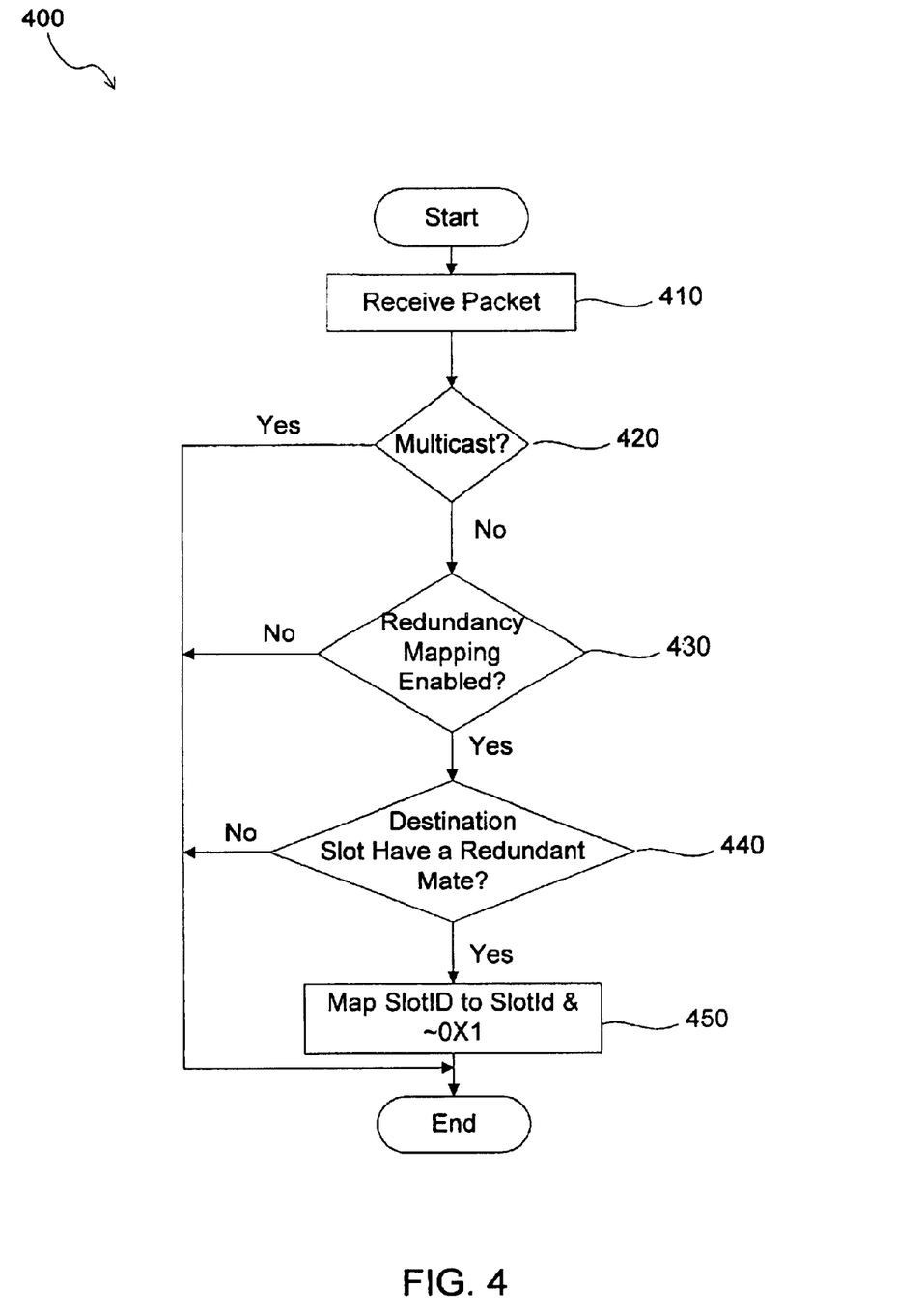
FIG. 4 is a flowchart illustrating a method for queue ID mapping.

FIG. 4 is a flowchart illustrating a method 400 for queue ID mapping. In an embodiment of the invention, queue ID mapping logic 320 executes method 400. First, a packet is received (410). The packet comprises a data portion and a header portion. The header portion can include a slot address corresponding to a card that is communicatively coupled to the destination node. Next, it is determined (420) if the packet is a multicast packet, i.e., if the header indicates that the destination is a plurality of network nodes instead of a single network node. If the packet is multicast, then the method 400 ends.

If it is determined (420) that the packet is not multicast (e.g., it is unicast), it is determined (430) if redundancy mapping is enabled. To determine (430) if redundancy mapping is enabled, the redundancy configuration register 310 can be examined. If it is determined (430) that redundancy mapping is not enabled, then the method 400 ends.

If it is determined (430) that redundancy mapping is enabled, then it is determined (440) if the destination slot (e.g., card), as indicated by the address in the header of the packet, has a redundant mate. To determine (440) if a destination slot has a redundant mate, the redundancy configuration register 310 can also be examined. If it is determined (440) that the destination slot does not have a redundant mate, then the method 400 ends.

If it is determined (440) that the destination slot does have a redundant mate, then the slot address is mapped (450) to, for example, an even-numbered slot for placement into an even-numbered queue. The mapping (450) is done by inputting the slot address into a two-input AND gate wherein the other input is logical not one, or in hexadecimal 1110. The output of the AND gate is an even-numbered queue address in which the packet is then placed. It will be appreciated that other circuit designs can be implemented to assure even or odd addresses, such as hardwiring the least significant bit. The method 400 then ends.

Figure 5:
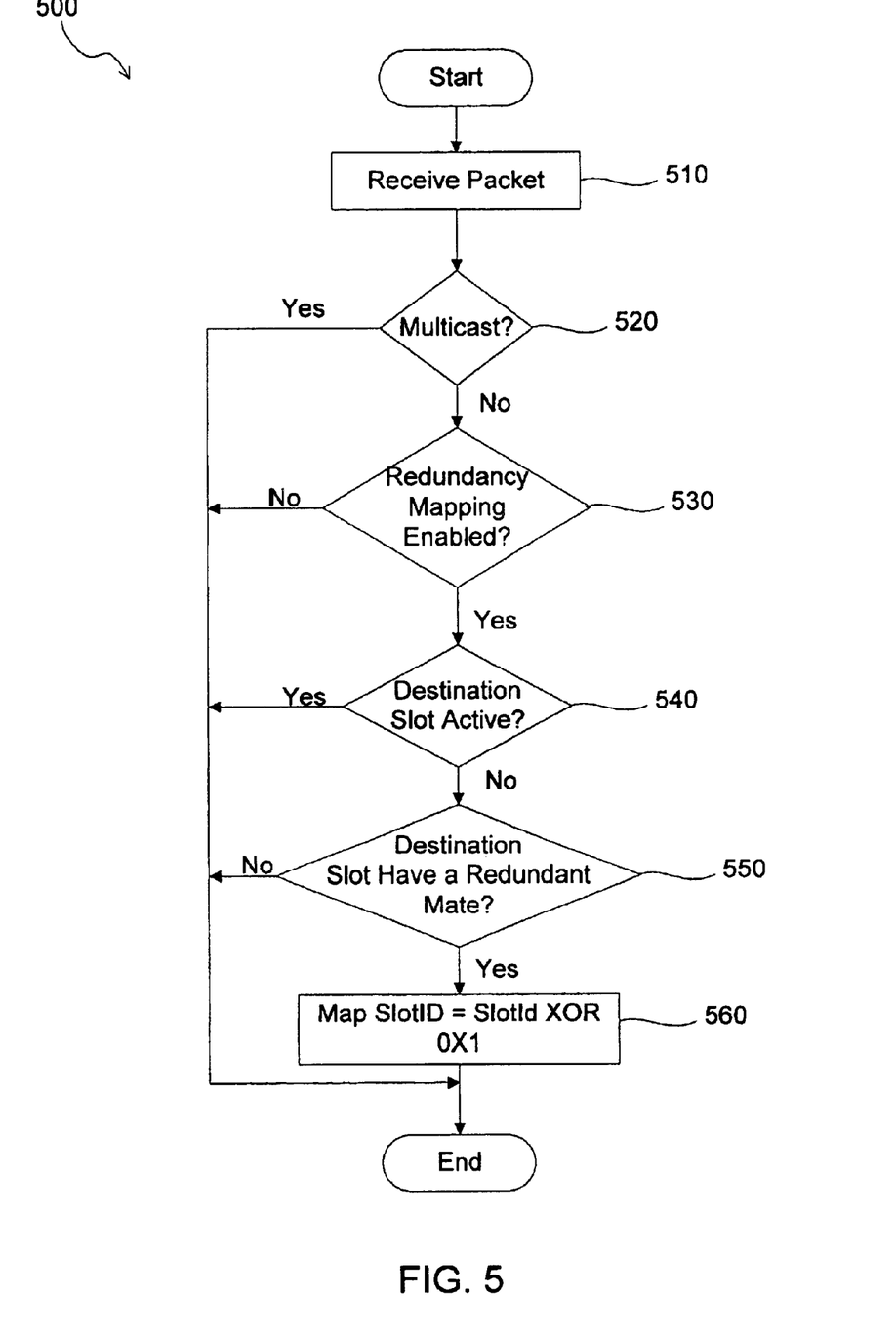
FIG. 5 is a flowchart illustrating a method for redundancy mapping.

FIG. 5 is a flowchart illustrating a method 500 for redundancy mapping. In an embodiment of the invention, the redundancy mapping logic 340 executes method 500. First, a packet is received (510) from a queue in virtual output queues 330. The packet comprises a data portion and a header portion. The header portion can include a slot address having a card that is communicatively coupled to the destination node. Next, it is determined (520) if the packet is a multicast packet, i.e., if the header indicates that the destination is a plurality of network nodes instead of a single network work node. If the packet is multicast, then the method 500 ends.

If it is determined (520) that the packet is not multicast (e.g., it is unicast), it is determined (530) if redundancy mapping is enabled. To determine (530) if redundancy mapping is enabled, the redundancy configuration register 310 can be examined. If it is determined (530) that redundancy mapping is not enabled, then the method 500 ends.

If it is determined (530) that redundancy mapping is enabled, then it is determined (540) if the destination slot (e.g., card) indicated in the header of the packet is active. The determination (540) can be done based on received slot active signals 350 received from other cards. If a card is active, the active card transmits an "active" signal (whether active high or active low) to all other cards via switching fabric 235. If a card is inactive (e.g., backup or failed), the inactive card transmits an "inactive" signal (or does not transmit a signal) to the other cards. If it is determined (540) that the destination slot is active, then the packet is transmitted without mapping and the method 500 ends.

If it is determined (540) that the destination slot is inactive, then it is determined (550) if the destination slot has a redundant mate. This determination (550) can be made by examining the redundancy configuration register 310. If it is determined (550) that the destination slot does not have a redundant mate, then the method 500 ends. Otherwise, the address of the packet is mapped (560) to the redundant mate. The mapping (560) can be accomplished by feeding the address into a two-input XOR gate wherein the second input is 0001. Accordingly, the mapping (560) maps the slot address to the redundant mate and transmits the packet to the redundant mate instead of to the inactive slot. The method 500 then ends.

The foregoing description of the illustrated embodiments of the present invention is by way of example only, and other variations and modifications of the above-described embodiments and methods are possible in light of the foregoing teaching. For example, the invention can be implemented in a service card, in a line card or any other type of card capable of being communicatively coupled to an IP network switching system. Components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A IP network switching system, comprising:
    a first egress IP network card connectable to a switching device;
    a second egress IP network card redundant to the first egress IP network card and connectable to the switching device; and
    an ingress IP network card connectable to the switching device and having hardware-based logic for determining which of the first egress IP network card or the second egress IP network card is active;
    wherein the ingress IP network card is further connectable to a network node and receives, from the network node, address information corresponding to one of the first or second egress IP network cards;
    wherein the logic modifies the address information if the egress IP network card represented by the address information is inactive;
    wherein the first egress IP network card is represented by a first address, the second egress IP network card is represented by a second address which differs from the first address by only the least significant bit, and wherein the logic modifies the address information by modifying only the least significant bit.

2. The system of claim 1, wherein the logic further has output queues to buffer the received address information.

3. The system of claim 1, wherein the first and second egress IP network cards transmit slot active signals to the ingress IP network card and wherein the logic uses the slot active signals for the determining.

4. The system of claim 1, wherein the logic further has a redundancy configuration register for use in the determining, the register capable of storing configuration data pertaining to the first and second egress IP network cards.

5. An ingress IP network card in a network switching system, comprising:
    terminals for receiving slot active signals indicating whether egress cards are active;
    terminals for receiving first address information representing an egress IP network card;
    hardware-based slot active logic for using the slot active signals to determine whether the egress IP network card represented by the first address information is active; and
    address modification logic for generating second address information representing a redundant egress IP network card if the slot active logic finds the egress IP network card represented by the first address information to be inactive;
    wherein the address modification logic generates the second address information by modifying a least significant bit of the first address information.

6. The card of claim 5, wherein the address modification logic includes a two-input XOR gate wherein the inputs are the first address information and a signal indicating a logical 1.

7. An ingress IP network card in a network switching system, comprising:
    terminals for receiving slot active signals indicating whether egress cards are active;
    terminals for receiving first address information representing an egress IP network card;
    hardware-based slot active logic for using the slot active signals to determine whether the egress IP network card represented by the first address information is active;
    a set of queues, corresponding to egress IP network cards, for buffering the received first address information; and
    queue mapping logic, communicatively coupled to the output queues, for placing the first address information into a queue selected from the set of output queues.

8. The card of claim 7, wherein the queue mapping logic includes a two-input AND gate wherein the inputs are the first address information and a signal indicating logical not 1.

9. A method performed by a hardware-based ingress IP network card in a switching system, comprising:
    receiving slot active signals indicating whether egress IP network cards are active;
    receiving first address information representing an egress IP network card;
    using the slot active signals to determine whether the egress IP network card represented by the first address information is active; and
    generating second address information representing a redundant egress IP network card if the egress IP network card represented by the first address information is determined to be inactive;
    wherein the generating includes modifying a least significant bit of the first address information.

10. The method of claim 9, wherein the modifying uses a two input XOR gate and wherein the XOR inputs are the first address information and a signal indicating a logical 1.

11. A method performed by a hardware-based ingress IP network card in a switching system, comprising:
    receiving slot active signals indicating whether egress IP network cards are active;
    receiving first address information representing an egress IP network card;
    using the slot active signals to determine whether the egress IP network card represented by the first address information is active; and
    after the receiving the first address information and before the using, placing the first address information into a queue of a set of queues corresponding to egress IP network cards.

12. The method of claim 11, wherein the placing uses a two-input AND gate to select the queue and wherein the inputs of the AND gate are the first address information and a signal indicating logical not 1.

* * * * *